(12) United States Patent
Baukes et al.

(10) Patent No.: US 10,079,724 B2
(45) Date of Patent: Sep. 18, 2018

(54) CONSENSUS-BASED NETWORK CONFIGURATION MANAGEMENT

(71) Applicant: UpGuard, Inc., Mountain View, CA (US)

(72) Inventors: Michael Franz Baukes, Sunnyvale, CA (US); Alan James Sharp-Paul, Los Altos, CA (US)

(73) Assignee: Upguard, Inc., Mountain View, CA (US)

( * ) Notice: Subject to any disclaimer, the term of this patent is extended or adjusted under 35 U.S.C. 154(b) by 223 days.

(21) Appl. No.: 15/049,018

(22) Filed: Feb. 20, 2016

(65) Prior Publication Data

US 2017/0244761 A1    Aug. 24, 2017

(51) Int. Cl.
*H04L 29/06* (2006.01)
*H04L 12/24* (2006.01)

(52) U.S. Cl.
CPC ...... *H04L 41/0873* (2013.01); *H04L 41/0816* (2013.01); *H04L 41/0893* (2013.01); *H04L 63/1433* (2013.01); *H04L 63/20* (2013.01); *H04L 41/0853* (2013.01)

(58) Field of Classification Search
CPC .......................... H04L 63/105; H04L 63/205
See application file for complete search history.

(56) References Cited

U.S. PATENT DOCUMENTS

| | | | | |
|---|---|---|---|---|
| 8,301,767 | B1* | 10/2012 | Davis | H04L 63/102 709/224 |
| 2006/0218640 | A1* | 9/2006 | Lotem | G06F 21/577 726/25 |
| 2010/0058442 | A1* | 3/2010 | Costa | H04L 63/20 726/3 |
| 2017/0118246 | A1* | 4/2017 | Murthy | H04L 63/20 |
| 2017/0126647 | A1* | 5/2017 | Zhang | H04L 63/08 |

\* cited by examiner

*Primary Examiner* — Noura Zoubair
(74) *Attorney, Agent, or Firm* — Fenwick & West LLP (57) ABSTRACT

Computer nodes in a network manage the configuration of neighbor nodes and enforce policy compliance by scanning neighboring nodes and taking corrective action based on consensus. A testing node scans a neighboring target node and identifies if the target node violates the policy. The testing node requests common neighbors of the target node to repeat the scan. If the common neighbors agree that the target node violates the policy, a corrective action is taken to ensure compliance with the policy. Corrective action includes reconfiguration of the target node. Nodes also perform negative checking to ensure adherence to separation rules restricting interaction between neighboring nodes. A testing node attempts to perform a restricted action with a neighboring restricted node. If the restricted action is successful, the testing node takes corrective action on the target node to ensure that subsequent attempts to perform the restriction action are denied access in compliance with the policy.

20 Claims, 10 Drawing Sheets

CONSENSUS-BASED NETWORK CONFIGURATION MANAGEMENT

FIELD OF ART

This application relates generally to the field of networking, and more specifically to techniques for the consensus-based management of the configuration of nodes in a network.

BACKGROUND

Many challenges exist in administrating a network of computing systems ("nodes"), particularly networks with hundreds, thousands, or more nodes. Complicating network management further is the potentially large variance in node operating systems, hardware configurations, software configurations, networking configurations, and the like. For instance, two nodes in the same network can include different versions of the same program, different programs, different hot fixes, and different operating systems. As used herein, a node's hardware configuration, operating system configuration, software configuration, network configuration, and other properties or characteristics is referred to collectively as a "node configuration" or simply "configuration". To provide a consistent standard for monitoring, maintaining, and configuring individual nodes within the network, a network administrator may devise one or more network node policies to govern the configuration of nodes within the network. The policies may include specific requirements relating to the configuration and operation of each node in the network. Given the potentially immense size of a network, centralized enforcement of the policies within the network may be inefficient or even impossible. Accordingly, there is a need for individual nodes of a network to enforce the policy of neighboring nodes as part of a consensus-based enforcement scheme.

SUMMARY

Policy compliance within a network is managed via a technique of consensus-based evaluation of node configurations. A network node policy (or "node policy") describes specific requirements relating to the configuration of one or more nodes in the network. Individual nodes evaluate the policy compliance of neighboring nodes by performing scans of neighboring nodes. A scan can include a request for access to one or more resources associated with the node, a test of one or more functional capabilities of the node, and an evaluation of one or more performance metrics corresponding to the node. Scans can be performed according to a regular diagnostic schedule or in response to human input (such as from a network administrator). Each node may retain a copy of any relevant node policies, based on which it can self-configure/self-enforce policy compliance. In some cases, a node configuration may contain an irregularity or error, either due to an error in locally-maintained node policies, due to an erroneous or outdated implementation of the node policies, or due to a malicious/unauthorized configuration (caused, for instance, by a virus or a hacker).

A node may identify an irregularity, error, or misconfiguration in a neighboring node in part by evaluating the neighboring node's compliance with one or more policies. In one implementation, a testing node identifies a possible irregularity in a neighboring node during a scan or other diagnostic action of the neighboring node. The testing node subsequently requests common neighbors (those nodes neighboring both the testing node and the node under test) to repeat or replicate the diagnostic action on the node under test first performed by the testing node. The common neighbors either validate or invalidate the results reported by the testing node. If the common neighbors are able to validate the results of the testing node, then the testing node takes corrective action on the node under test to ensure its compliance with the node policies. In instances in which a testing node is misconfigured or out of compliance with one or more associated policies, the testing node may identify an error in the neighboring node under test although none exists. As a result, if common neighbors fail to validate the results of the testing node, they can subsequently scan and take corrective action to rectify any irregularities identified in the testing node.

In another aspect of node policy enforcement, nodes may be subject to separation rules which prohibit particular types of interaction or communication between neighboring nodes. Separation rules may be effected in multiple ways, such as by configuring nodes according to node policies that implement the separation rules, or by implementing a firewall between nodes in the network. To ensure adherence to the separation rules, nodes perform negative checking on neighboring nodes. In one example, a testing node attempts to scan a prohibited (or "off-limits") neighboring target node. If the target node grants access to a requested but off-limits resource during the scan or responds to the scan in an otherwise prohibited manner, then the testing node identifies a violation of the separation rules. The testing node may subsequently take corrective action on the target node or on the firewall (if applicable), or request further review by a network administrator.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Node Policy Generation and Implementation

Figure 1:
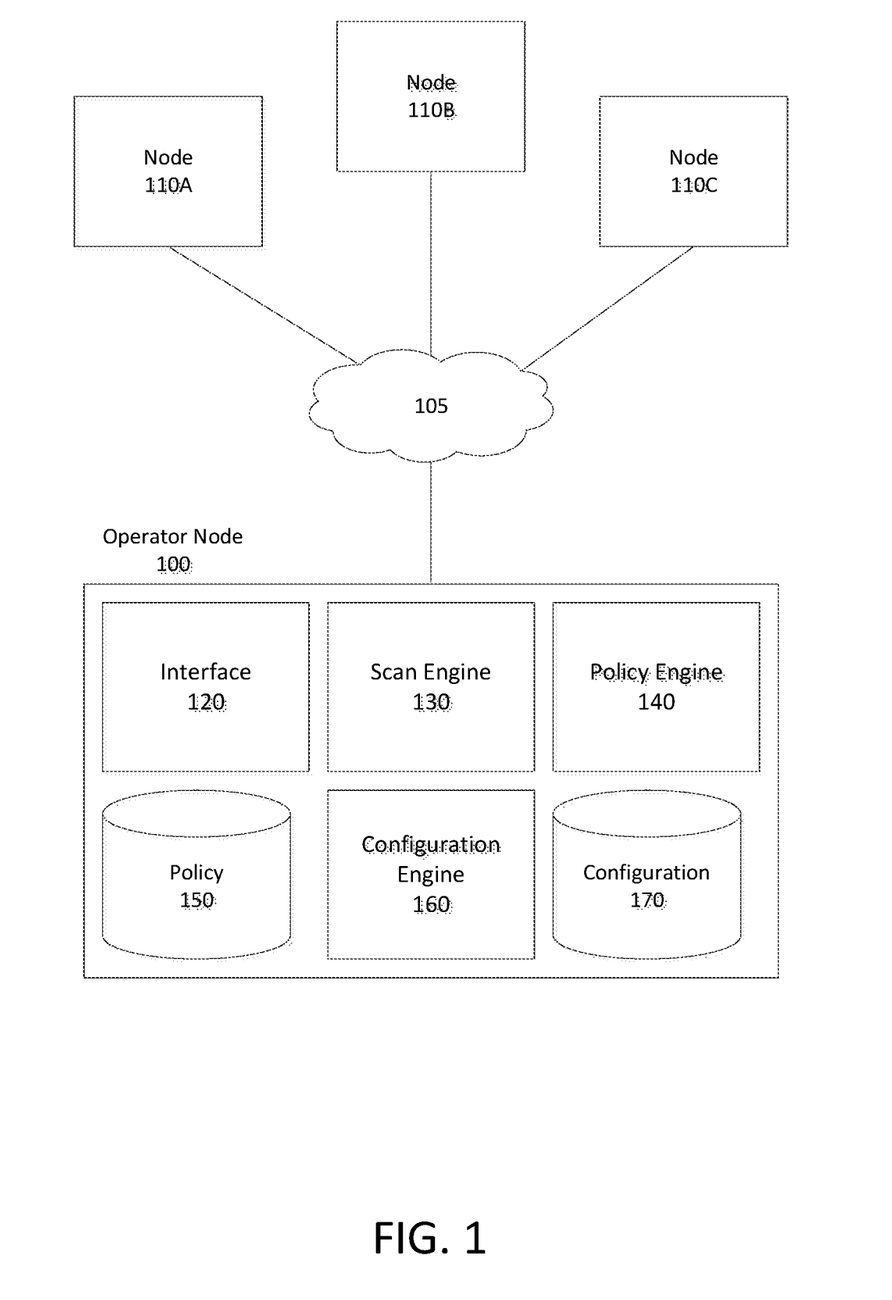
FIG. 1 illustrates a networking environment, according to one embodiment.

FIG. 1 illustrates a networking environment, according to one embodiment. The environment of FIG. 1 includes an operator node 100 and a plurality of additional nodes (nodes 110A, 110B, and 110C) communicatively coupled to the operator node by the network 105. It should be noted that in alternative embodiments, the environment of FIG. 1 can include additional, fewer, or different components than those illustrated in FIG. 1. For instance, alternative embodiments can include any number of nodes (from as few as one node 110 to hundreds or thousands or more nodes). In addition, it should be noted that in some embodiments, the operator node can be configured similarly to or the same as one or more of the nodes 110, but that for the purpose of simplicity, the term "operator node" is used merely to indicate the node from which a node policy is generated or implemented, for instance by a network manager, administrator, or other user, or by an automation application or script (with or without the supervision of a human operator).

Each node 110 is a computing system capable of transmitting or receiving data via the network 105. Examples of nodes include but are not limited to personal computers, laptop computers, server computers, mobile devices (such as tablet computers or mobile phones), specialized computers or systems (such as medical computing systems, financial computing systems, databases, and the like), network computing systems (such as routers, switches, firewall computing systems, and the like), web service endpoints, databases, or any other suitable computing system. Each node includes a node configuration that describes one or more properties or characteristics of the node, for instance the hardware configuration of the node (such as the identity, type, brand, properties, or capabilities of one or more hardware components or mounts of the node), the software configuration of the node (such as the identity or version of one or more applications installed on the node, patches or hot fixes installed on the node, files stored at the node, application settings or configurations, scheduled tasks, groups to which the node belongs, packages or services installed at or corresponding to the node, inventory items corresponding to the node, registry keys corresponding to the node, and the like), the operating system configuration of the node (such as the identity or version of the operating system, the identity or version of operating system patches or components, operating system services, operating system configurations or settings, and the like), the networking configuration of the node (such as ports, network interfaces, environment variables, routes, one or more node communicative configurations or settings, one or more security configurations or settings, access control lists or "ACLs" corresponding to the node, and the like), and properties or characteristics corresponding to one or more users of the node. As used herein, each property or characteristic of a node is referred to as a "node object", "node attribute", or simply an "attribute". In some embodiments used herein, node objects or node attributes are limited to node software or firmware components, such as applications, patches, hot fixes, files, drivers, and the like.

The network 105 can be any suitable network, such as the Internet, a LAN, a MAN, a WAN, a mobile wired or wireless network, a private network, a virtual private network, a direct communication line, and the like. The network can also be a combination of multiple different networks of the same or different types.

The operator node 100 includes an interface module 120, a scan engine 130, a policy engine 140, a policy storage module 150, a configuration engine 160, and a configuration storage module 170. In some embodiments, the operation node can include different or additional components than those illustrated in the embodiment of FIG. 1.

The interface module 120 provides the communicative interface between the operator node 100, the modules of the operator node, the one or more nodes 110, and a user of the operator node. The interface module requests information (such as configuration information) from the nodes 110, for instance in response to a request by the scan engine 130. The interface module receives the requested information, and provides it to one or more other modules or displays it, for instance to a user of the operator node. The interface module can provide a policy to a node 110, can provide requests to a node to configure the node according to the policy, and can generate one or more user interfaces to display policy or configuration information, for instance the differential visualizations described below. The interface module can receive input from a user, can provide received inputs to one or more other modules of the operator node or a node 110, and can store policy information and node configuration information (for instance in the policy storage module 150 or the configuration storage module 170, respectively).

The scan engine 130 is configured to scan each of one or more nodes 110 to identify a node configuration and/or node objects installed at the node. In some embodiments, the scan engine scans nodes in response to a request by a user of the operator node 100, in response to a request by the policy engine 140 (to generate or implement a policy), or in response to the passage of a pre-determined period of time (for instance, a periodic scan in order to ensure policy compliance or to gather information about the state of a node over time). In some embodiments, the scan engine simply requests each node to scan itself and provide configuration information and/or information associated with node objects installed at the node, while in other embodiments, the scan engine performs the scan at the node. In some embodiments, the scan engine scans all objects installed at the node, while in other embodiments, the scan engine scans only a pre-determined subset of node objects, for instance objects identified by a node policy.

The policy engine 140 generates and/or implements a node policy for one or more nodes 110. As used herein, "policy" can refer to an identification of a node configuration and/or one or more node objects. Further, a policy can include a set of tests to test for the presence or absence of the identified node configuration or node objects. As used herein, the generation of a node policy refers to the creation of a policy based on an identified or selected node configuration and/or node objects. As used herein, the implementation of a node policy refers to the application of the node policy to a node to identify compliance with the node policy, for instance to determine if the node includes a node configuration and/or node objects identified by the node policy. The implementation of a node policy can further include the configuration of a node based on the node policy, for instance by configuring the node into a node configuration identified by the node policy, and/or to install one or more node objects identified by the node policy. It should be noted that in some embodiments, a node policy can identify a node configuration and/or node objects to exclude. For instance, a policy can identify a software patch to exclude, and implementing such a policy can involve testing for the absence of the identified patch and/or the removal of the identified patch.

The policy engine 140 identifies, for one or more nodes 110, a node configuration of each node and/or node objects installed at each node, for instance by scanning the one or more nodes via the scan engine 130. The policy engine creates a policy based on one or more of: a node configuration, node objects installed at each node, user input identifying one or more objects to include within the policy, a role of a user, or any other suitable information. For instance, the policy engine can identify a set of objects installed at the node (such as software components, hot fixes, patches, and files), can display the identified set of objects to a user, and can receive a selection of a subset of the objects by the user. The policy engine can then generate a policy identifying the selected subset of objects. The policy can be stored in the policy storage module 150 for subsequent use and application. It should be noted that in some embodiments, the policy engine can generate a policy without identifying a node configuration or objects stored at a node. For example, a user of the operator node 100 can select a node configuration or node objects from a pre-generated list of objects presented by the policy engine via the interface module, and can generate a policy based on the selected node configuration or node objects.

Each policy identifies a set of selected node objects, and can include one or more scripts or executable programs configured to test for the presence or absence of the set of selected node objects. Each object identified by a policy can be classified within the policy based on an object type (for instance, an object can be classified as a "patch" or a "driver"), based on an operating system associated with a node (for instance, "OSX" vs. "Windows" vs. "Linux"), based on a hardware type or build associated with the node (for instance, "Cisco" vs. "Juniper"), or based on any other suitable object characteristic or property. Further, each object can be classified as "include" or "exclude" to indicate whether to test for the inclusion or exclusion of a particular object.

In some embodiments, policies also include scripts or executables configured to automate the configuration of a node to include or exclude objects identified by a policy. For instance, a policy can include a set of scripts each configured to install one or more identified objects on a target node. Beneficially, this automates the configuration of a new node included within the network to include a set of objects identified by a particular user as essential for operation within the network, for installation and operation of a particular application, and the like.

In some embodiments, policies can be written in universal languages (such as Ruby, C, and the like), and can identify universal objects (for instance, a particular hot fix for an application). Alternatively, policies can be written in a domain specific language ("DSL"), and can identify domain-specific objects. For instance, a policy generated for a particular server can be written in a proprietary language specific to the server, to the manufacturer or brand of the server, and the like. Similarly, the objects identified by a policy can be domain-specific objects. For instance, a web browser patch for an OSX or iOS machine may be different than a corresponding patch for a Windows machine. Accordingly, the identification of such a patch in a policy may be specific to a particular node configuration.

In order to test a target node for compliance with a policy written in a particular DSL, or to configure a node based on the policy, the policy can be mapped from the DSL to a universal language, or to a DSL corresponding to the target node. Likewise, in order to test a target node for compliance with a policy written in a universal language, the policy can be mapped to a DSL corresponding to the target node. As used herein, such policy mappings are referred to as the mapping of a policy from a first domain to a second domain. To map a policy from a first domain to a second domain, a universal mapping of corresponding objects can be queried for each object in the first domain identified by the policy to identify a corresponding object in the second domain. The universal mapping can map a particular object in a first domain to corresponding objects in each of one or more additional domains. For example, for a particular iOS file corresponding to a security application, the universal mapping can map corresponding Windows and Linux files to the iOS file. Similarly, for each test and automation script or executable in the first domain within the policy, a corresponding script or executable can be generated in the second domain. In some embodiments, the universal mapping is stored at the operator node 100, while in other embodiments, the mapping is stored at another entity within the environment of FIG. 1 or external to the environment of FIG. 1. It should be noted that in some embodiments, instead of a universal mapping, one or more domain-to-domain mappings (mappings from a first domain to a second domain) can be queried to map a policy to a different domain.

Once the policy is mapped from the first domain to the second domain corresponding to the target node, the mapped policy can be applied to the target node. For instance, the target node can be scanned, and the mapped policy can be used to identify whether the target node includes the objects identified by the target node. Likewise, if the policy includes test scripts or executables configured to test for the presence or absence of identified objects, the mapped scripts or executables can be run to test for the presence or absence of objects mapped to the identified objects at the target node. If the policy includes automation scripts or executables configured to configure a target node to include identified objects, the mapped automation scripts or executables can be run to configure a target node to include mapped objects.

The configuration engine 160 is configured to configure one or more nodes within the environment of FIG. 1 based on one or more policies. In embodiments where a policy includes automation scripts or executables configured to configure a target node, the configuration engine can run the automation scripts or executables to configure the target node, for instance automatically or in response to a request by a user of the operator node 100. In embodiments where a policy does not include such automation scripts or executables, the configuration engine can configure a target node by generating and running such automation scripts and executables, by providing a list of the objects identified by the policy to the target node to enable the node to self-configure based on the identified objects, by providing the list of identified objects to a network administrator or manager to enable the administrator or manager to configure the target node, or based on any other suitable method. In embodiments where a target node is within a different domain or is associated with a different DSL than a policy, the configuration engine can map the policy to the domain or DSL associated with the target node before configuring the target node. In some embodiments, the configuration engine is configured to test a target node for compliance with a policy by scanning the target node to identify a configuration of the target node and by identifying configuration differences between the target node and the policy (such as a list of objects identified by the policy that are not installed at the target node). In some embodiments, the configuration engine can store configuration information associated with scanned nodes within the configuration storage module 170.

In some embodiments, the configuration module 160 can, upon scanning a target node to test for compliance with a policy, display (via the interface module 120) the objects identified by the policy and an indication of which of the identified objects are installed at the target node and which of the identified objects are missing from the target node. In some embodiments, such a display can be configured as a delta between the configuration of the target node and the policy, for instance by displaying a list of objects identified by the policy and missing from the target node, or by displaying objects identified by the policy and installed at the target node in a first color and displaying objects identified by the policy and not installed at the target node in a second color. In some embodiments, compliance with a policy and multiple nodes can be displayed, for instance by illustrating the objects identified by the policy and missing from the configuration of each of the nodes within a single interface or display. In such embodiments, the visualization of the compliance of multiple nodes with a policy can be layered such that a user can visualize compliance at a high level (such as at an environment or data center level for multiple nodes), down through medium and low levels (such as node groups and individual nodes). In some embodiments, compliance and non-compliance at each level is displayed with different colors (for instance, compliance and non-compliance for particular objects at an environment level can be displayed with a first and second color, respectively, and compliance and non-compliance at a node group level can be displayed with a third and fourth color, respectively).

In some embodiments, the configuration module 160 can configure multiple nodes simultaneously or substantially simultaneously using a particular policy. In such embodiments, the configuration module 160 can identify, for each of the multiple nodes, a set of objects identified by the policy and not installed at the node, and can install the identified set of objects at the node. In some embodiments, a node can be configured with multiple policies. For instance, a first policy corresponding to (for example) security objects can be used to configure a target node, and a second policy corresponding to (for example) networking objects can be used to configure the target node. In such embodiments, the security objects identified by the first policy can be different than the networking objects identified by the second policy, and thus the target node can be configured according to both policies simultaneously.

Figure 2:
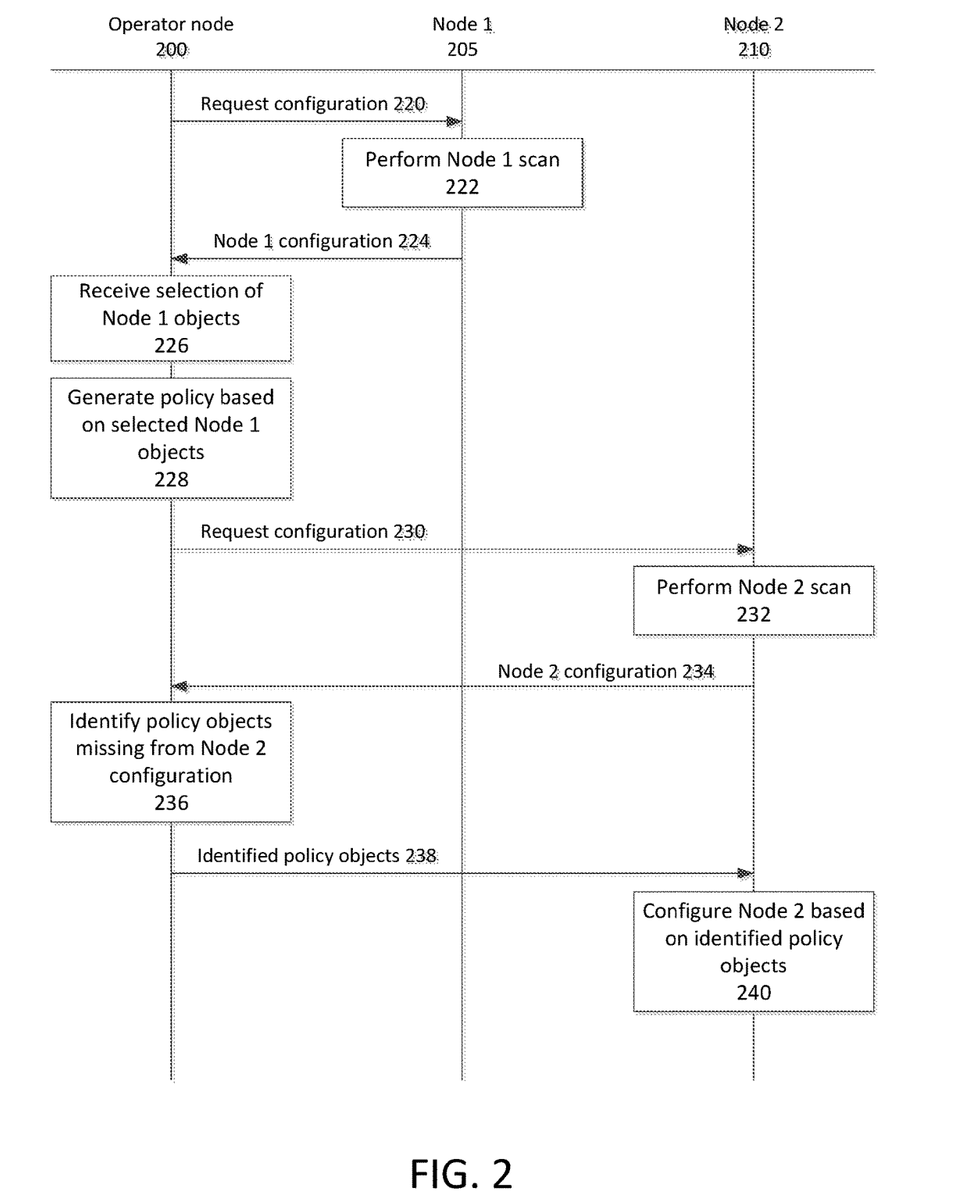
FIG. 2 is an interaction diagram illustrating the generation of a node policy and the configuration of a node based on the node policy, according to one embodiment.

FIG. 2 is an interaction diagram illustrating the generation of a node policy and the configuration of a node based on the policy, according to one embodiment. In the embodiment of FIG. 2, an operator node 200, a first node ("Node 1") 205, and a second node ("Node 2") 210 interact within a network. The operator node 200 sends a request 220 for configuration information to Node 1. A scan of Node 1 is performed 222 in response to the request to determine the configuration of Node 1 (such as the objects installed at Node 1). The configuration information 224 of Node 1 is provided to the operator node, which receives 226 a selection of objects installed at Node 1, for instance from a user or network administrator/manager. A policy is then generated 228 by the operator node based on the selected Node 1 objects.

The operator node 200 sends a request 230 for configuration information to Node 2. A scan of Node 2 is performed 232 (for instance, to identify objects installed at Node 2), and the resulting configuration information 234 of Node 2 is provided to the operator node. The operator node identifies 236 objects identified in the policy that are missing from the Node 2 configuration (e.g., objects identified in the policy that are not installed at Node 2). The identified policy objects 238 missing from the configuration of Node 2 are provided to Node 2, and Node 2 is configured 240 based on the identified policy objects (for instance, by installing the identified policy objects at Node 2). It should be noted that in some embodiments, if Node 2 is a new node being added to a network, instead of scanning Node 2 to identify policy objects missing from the configuration of Node 2, a list of all objects identified by the policy can be provided to Node 2, and Node 2 can be configured to include the list of objects.

Figure 3:
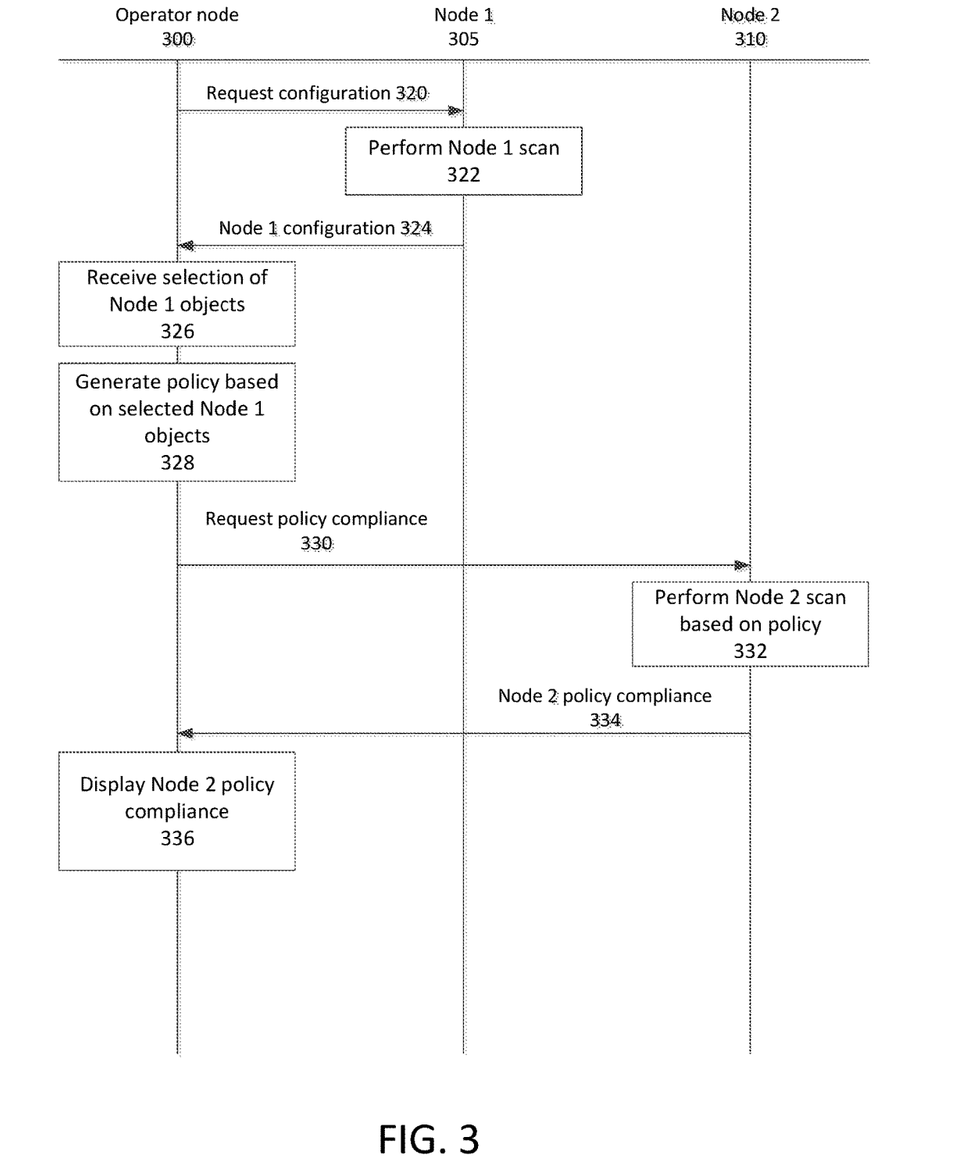
FIG. 3 is an interaction diagram illustrating the generation of a node policy and the testing of a node for compliance with the node policy, according to one embodiment.

FIG. 3 is an interaction diagram illustrating the generation of a node policy and the testing of a node for compliance with the policy, according to one embodiment. In the embodiment of FIG. 2, an operator node 300, a first node ("Node 1") 305, and a second node ("Node 2") 310 interact within a network. The operator node sends a request 320 for configuration information to Node 1, a scan of Node 1 is performed 322, and configuration information 324 describing the configuration of Node 1 is provided to the operator node. A selection of Node 1 objects is received, and a policy is then generated 328 by the operator node based on the selected Node 1 objects.

The operator node 300 requests 330 a policy compliance determination of Node 2 in view of the generated policy. A scan of Node 2 is performed 332 based on the policy. For instance, Node 2 is scanned to identify the presence or absence of objects identified within the policy. Policy compliance information 334 describing the compliance of Node 2 with the policy is provided to the operator node, and the operator node displays 336 the policy compliance information. For instance, the operator node can identify objects identified within the policy but missing from the configuration of Node 2, and can display a user interface illustrating the identified missing objects to a user of the operator node (such as a network manager or administrator).

Figure 4:
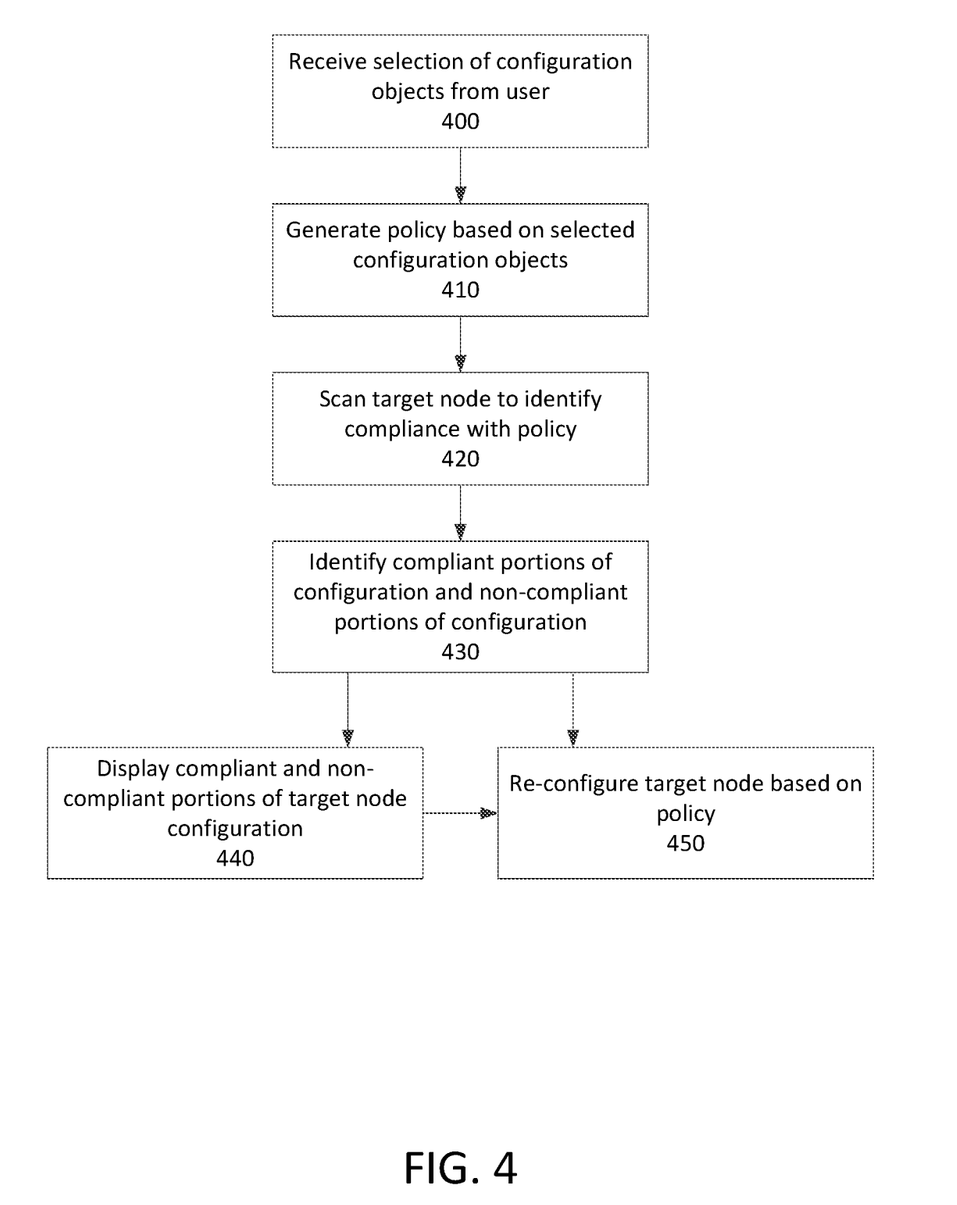
FIG. 4 is a flowchart illustrating the generation and implementation of a node policy, according to one embodiment.

FIG. 4 is a flowchart illustrating the generation and implementation of a node policy, according to one embodiment. A selection of configuration objects is received 400 from a user. For instance, a set of files, hot fixes, patches, and drivers can be selected by a network manager or node configuration application. A policy is generated 410 based on the selected objects. A target node is subsequently scanned 420 to identify compliance with the policy. Compliant portions of the target node configuration (for instance, objects identified by the policy and installed at the target node) and non-compliant portions of the target configuration (for instance, objects identified by the policy but not installed at the target node) are identified 430. One or more of the identified compliant and non-compliant portions of the target node configuration are displayed 440. For instance, the objects identified by the policy and not installed at the target node can be graphically displayed within a user interface to a user. The target node is re-configured 450 based on the policy, by installing objects identified by the policy and not currently installed at the target node.

Consensus-Based Evaluation of Node Configurations

As described with reference to FIG. 1, a networking environment includes a plurality of interconnected nodes. In the embodiment depicted by FIG. 1, the networking environment includes an operator node 100 which is connected to other nodes 110. In another embodiment, a networking environment does not include a dedicated operator node 100. The networking environment instead consists of a plurality of interconnected nodes, each of which can perform the functionality of an operator node (such as scans and policy compliance determinations) with respect to one or more other nodes. In such embodiments, compliance with and enforcement of a policy within a networking environment is implemented according to a consensus-based approach.

To implement a consensus-based policy compliance within a network, individual nodes 110 of the networking environment are configured to evaluate policy compliance by scanning neighboring nodes. A scan involves an attempt to communicate with a node, to access one or more resources associated with the node, and/or to evaluate the functionality of the node. For example, as part of a scan, a node (the "testing node") may request a neighboring node (the "target node") to provide a list of whitelisted IP addresses corresponding to or stored by the neighboring node. In various embodiments, scans involve an evaluation of only a subset of the configuration properties of a node. Scan results can include a summary of the target node's configuration, a collection of files stored by or accessible to the target node, or other data provided by the target node in response to the scan. In one embodiment, a testing node scans only those files, configuration settings, properties, or functionalities of a target node which are associated with or in some way relevant to the testing node and/or with the policy against which compliance is being tested.

Scans performed by a testing node on a target node may reveal irregularities in the target node. Irregularities refer to configuration properties or settings that violate a portion of the policy against which compliance is being tested. In one embodiment, a testing node identifies an irregularity by comparing the results of the scan against the copy of the policy against which compliance is being tested and which is stored by or accessible to the testing node. In some embodiments, if a target node fails to respond altogether to a scan request from the testing node, the testing node identifies the failure to respond as an irregularity and a policy compliance violation.

Figure 5A:
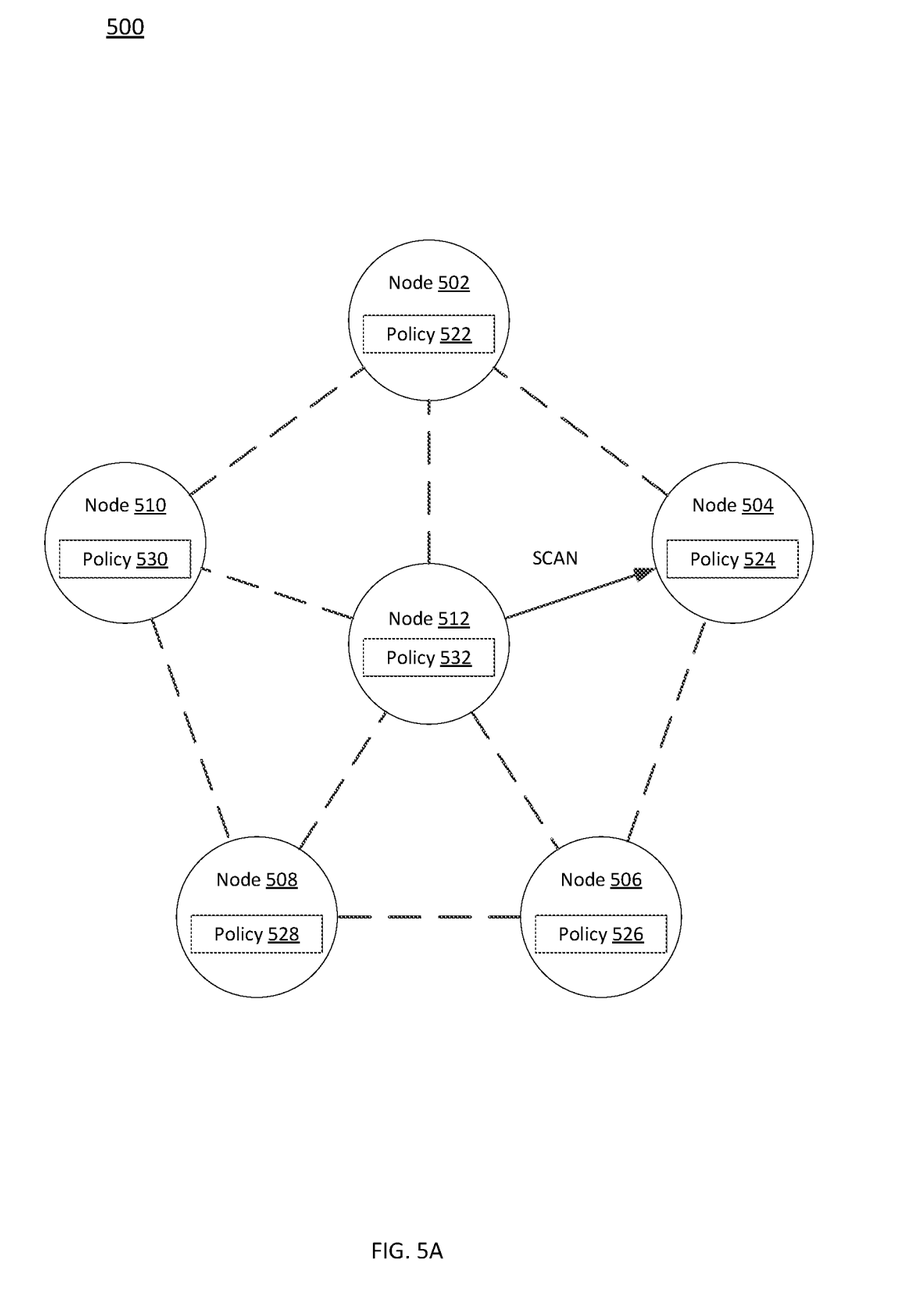
FIG. 5A is a diagram illustrating a scan being performed on a target node by a testing node within a networking environment, according to one embodiment.

FIG. 5A is a diagram illustrating a scan being performed on a target node by a testing node within a networking environment, according to one embodiment. The environment 500 includes six nodes 502, 504, 506, 508, 510, and 512. Node 512 is coupled to each of the other nodes; nodes 502, 504, 506, 508, and 510 are each coupled to three other nodes, one of which is node 512. Each node further includes a copy of a policy; node 502 includes policy 522, node 504 includes policy 524, node 506 includes policy 526, node 508 includes policy 528, node 510 includes policy 530, and node 512 includes policy 532. It should be noted that although in various embodiments, any number of policies may be implemented within a network (including a different set of policies for each node in the network), the remainder of the description herein will be limited to embodiments in which each node 502-512 is configured according to the same policy (or in other words, each of the policies 522-532 is the same policy).

In this embodiment, the node 512 initiates a scan of the node 504 for the purpose of determining its configuration for use in evaluating the compliance of the node 504 with the policy 532 stored by the node 512. After receiving a response to the scan from the node 504 (including, for instance, configuration properties of the node 504 corresponding to the policy 532), the node 512 compares the configuration of the node 504 against the policy 532. If the node 512 determines that the configuration of the node 504 is compliant with the policy 532, then no further action is taken. However, if the node 512 determines that the configuration of the node 504 is non-compliant with the policy 532, the node 512 requests the nodes 502 and 506, which are common neighbors of the node 504, to repeat the scan of the node 504. As described herein, compliance with a policy can refer to complete compliance with a policy, a threshold level of compliance with a policy (e.g., compliant with more than a threshold number of configuration properties identified by the policy), compliance with all or a threshold number of high priority configuration properties identified by the policy, or any other suitable measure of policy compliance as described herein.

Figure 5B:
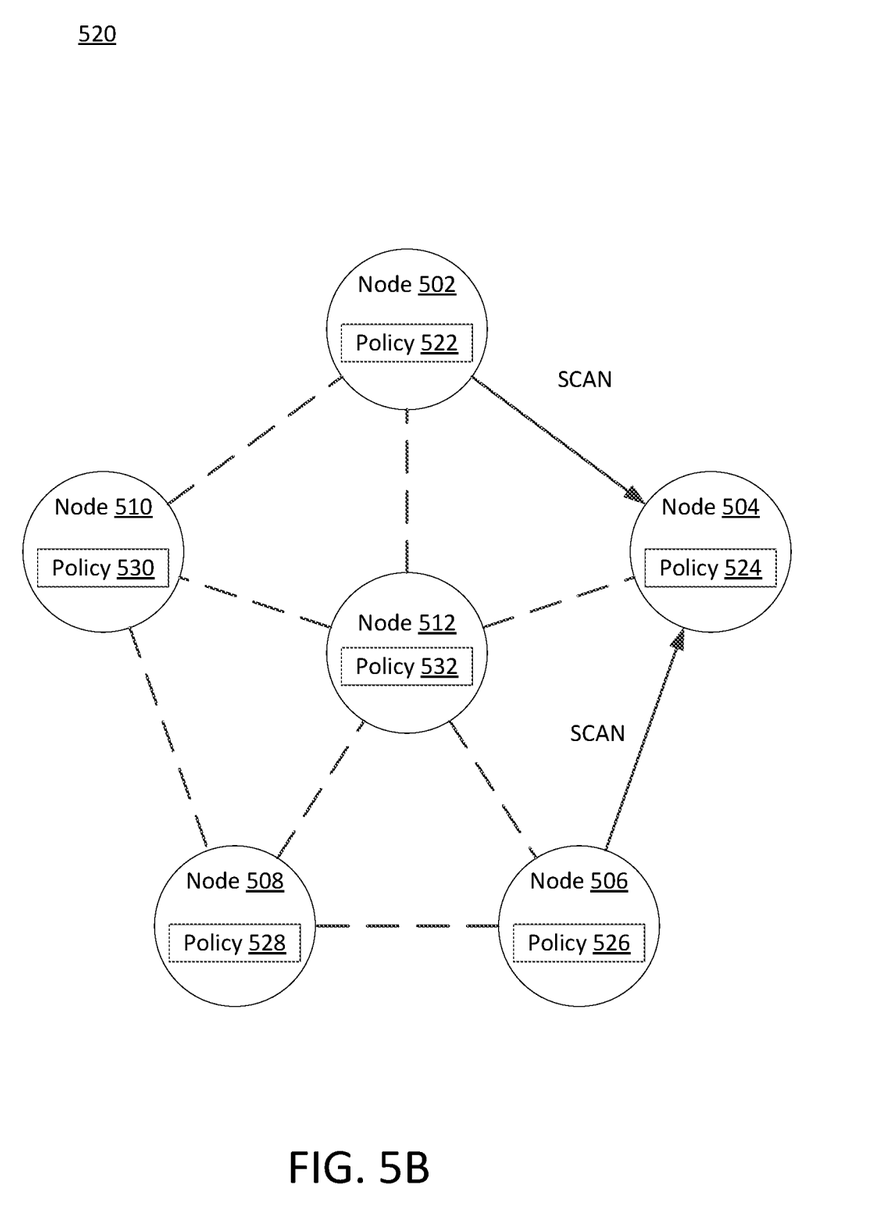
FIG. 5B is a diagram illustrating a scan being performed on a target node by common neighbors of the target node and the testing node, according to one embodiment.

FIG. 5B is a diagram illustrating a scan being performed on a target node by common neighbors of the target node and the testing node, according to one embodiment. In response to a request by the node 512 to repeat the scan of node 504, the nodes 502 and 506 repeat the scan of the node 504 and compare it against the policies 522 and 526, respectively. If each of the nodes 502 and 506 agree that the node 504 is in violation of their respective policies, they provide confirmation of the policy violation to the node 512. The node 512 then takes corrective action on the node 504 to ensure compliance with the policy. In one embodiment, corrective action includes reconfiguration of the node 504 and/or modification of the policy 524 (for instance, updating the policy to a more recent version of the policy or modifying the policy to correct for the portion of the policy responsible for the policy violation, and the like). In another embodiment, the node 512 simply flags the node 504 for further review by a human administrator of the network.

Figure 5C:
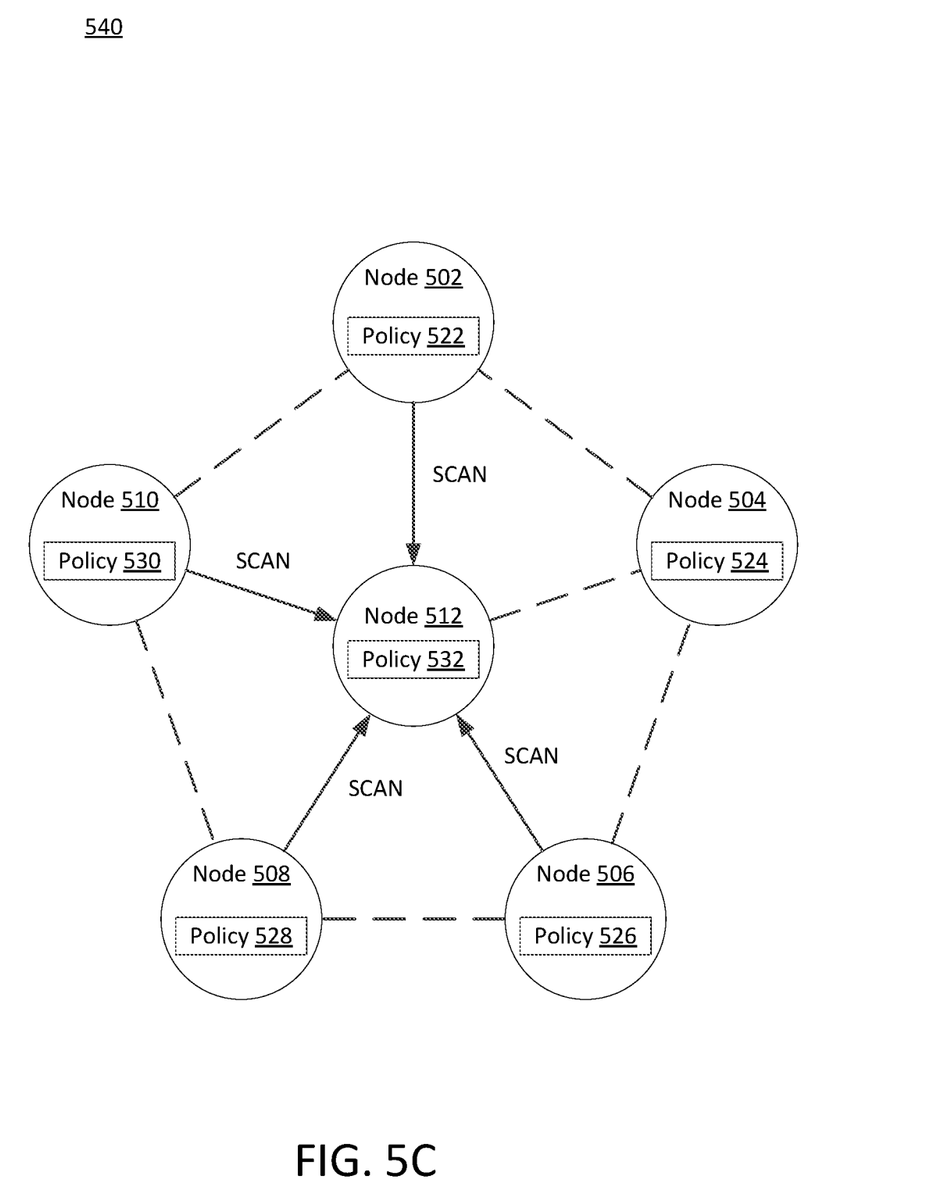
FIG. 5C is a diagram illustrating a scan being performed on a testing node by neighbors of the testing node, according to one embodiment.

However, if the nodes 502 and 506 determine that the node 504 is in compliance with the policies 522 and 526, respectively, then the nodes 502 and 506 can determine that the node 512, which first identified the possible policy violation of the node 504, may itself be misconfigured or in violation of a policy. Accordingly, in response to such a determination, one or both of the nodes 502 and 506 can request all common neighbors of the node 512 to perform a scan of the node 512 to evaluate the policy compliance of the node 512. FIG. 5C is a diagram illustrating a scan being performed on a testing node by neighbors of the testing node, according to one embodiment. The node 510 is a common neighbor of the node 502 and the node 512, and the node 508 is a common neighbor of the node 506 and the node 512. Therefore, the nodes 502, 506, 508, and 510 perform a scan of the node 512 and compare the result against the policies 522, 526, 528, and 530 respectively. If a majority of the nodes 502, 506, 508, and 510 determine that the node 512 is in violation of the policy, then one or more of these nodes takes corrective action on the node 512 to ensure compliance with the policy. Correction action may include reconfiguration of the node 512 or modification of the policy 532. It should be noted that in some embodiments, a testing node is scanned by neighbors in response to a majority of nodes that tested a target node (including the testing node and all neighbors of the target node that scanned the target node at the request of the testing node) determining that the target node satisfied a threshold level of compliance with the tested policy.

Figure 6:
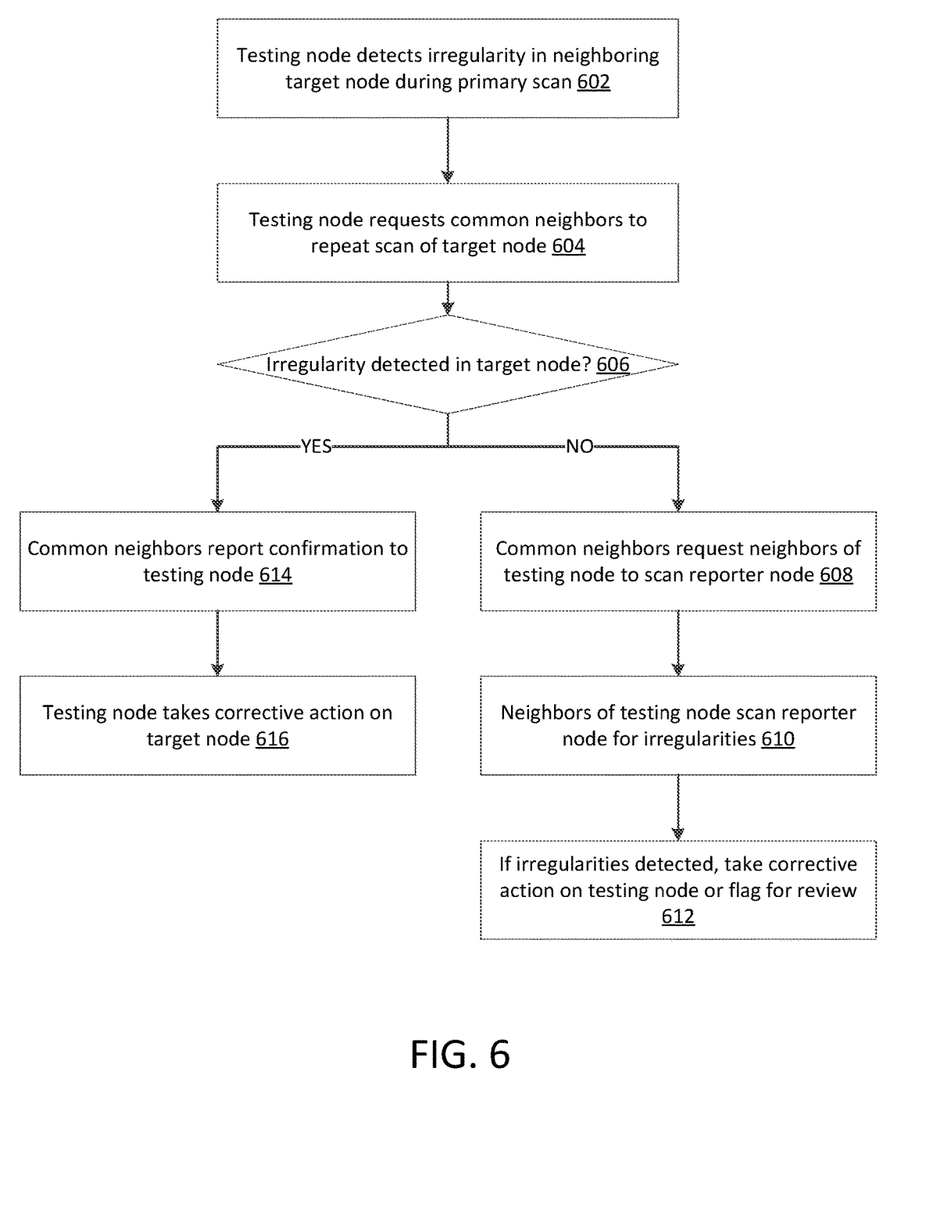
FIG. 6 is a flowchart illustrating a process for addressing a policy violation detected by a node in a network, according to one embodiment.

FIG. 6 is a flowchart illustrating a process for addressing a policy violation detected by a node in a network, according to one embodiment. A testing node detects 602 an irregularity or policy compliance violation in a neighboring target node during a primary scan. The testing node then requests 604 the common neighbors of the testing node and target node to repeat a scan of the target node (though it should be emphasized that in some embodiments, the testing node can request neighbors of the target node that aren't directly communicatively coupled with the testing node to scan the target node). The common neighbors then determine 606 if an irregularity or policy compliance violation is present in the target node. If an irregularity or policy compliance violation is detected, the common neighbors report 614 a confirmation of the irregularity/violation to the testing node. The testing node subsequently takes 616 corrective action with respect to the target node (for instance, reconfiguring the target node, quarantining the target node, etc.). However, if no irregularity is detected in the target node by the neighbors of the target node other than the testing node, the neighbors request 608 neighbors of the testing node to perform a scan of the testing node. Accordingly, the neighbors of the testing node scan 610 the testing node. If one or more or a majority of the neighbors detected an irregularity or policy compliance violation by the testing node, one or more of the neighbor nodes takes 612 corrective action on the testing node or flags it for further review.

Negative Compliance Checking

In some embodiments, a network may be configured in such a way as to prohibit various types of communication or interaction between one or more nodes. Such a configuration can be implemented via the policy retained by each node, or may be effected by a firewall installed by the administrator of the network between nodes within the network. It should be noted that such negative compliance checking can be performed in conjunction with the consensus-based evaluation of node configurations as described above, thereby enabling nodes to determine if a target node is misconfigured by determining if the target node is able to perform or participate in a restriction communication or interaction.

In order to ensure that restrictions in communication, interaction, or resource access ("restricted operations" hereinafter) are property effected between nodes, an enforcement mechanism of "negative checking" may be implemented in a network. In such embodiments, a testing node can identify policy violations by attempting to perform restricted operations with a target node. In one embodiment, a control node directs a first node to attempt to perform a restricted operation with a second node. The first node and second node may be isolated by a firewall or configured so as to prohibit all interaction. In one example embodiment, each of the two nodes may mutually blacklist the IP address of the other node. The first node attempts to scan the second node, expecting a denial of access or similar error message. If the second node responds to the scan or otherwise grants access to requested information, then the second node (or the firewall) may be misconfigured. The control node may then take further diagnostic or corrective action one on or more nodes to enforce the restrictions, for instance reconfiguring one or both nodes or the firewall, or quarantining one or both nodes. In another embodiment, the first node may, without being instructed by the control node, attempt to perform a restricted operation defined by a policy with the second node, and in response to a result of the performed restricted operation contrary to the policy, can report the response as a potential misconfiguration or policy violation (for instance to a control node), or can take a corrective action (for instance, by reconfiguring the second node in accordance with the policy).

Figure 7:
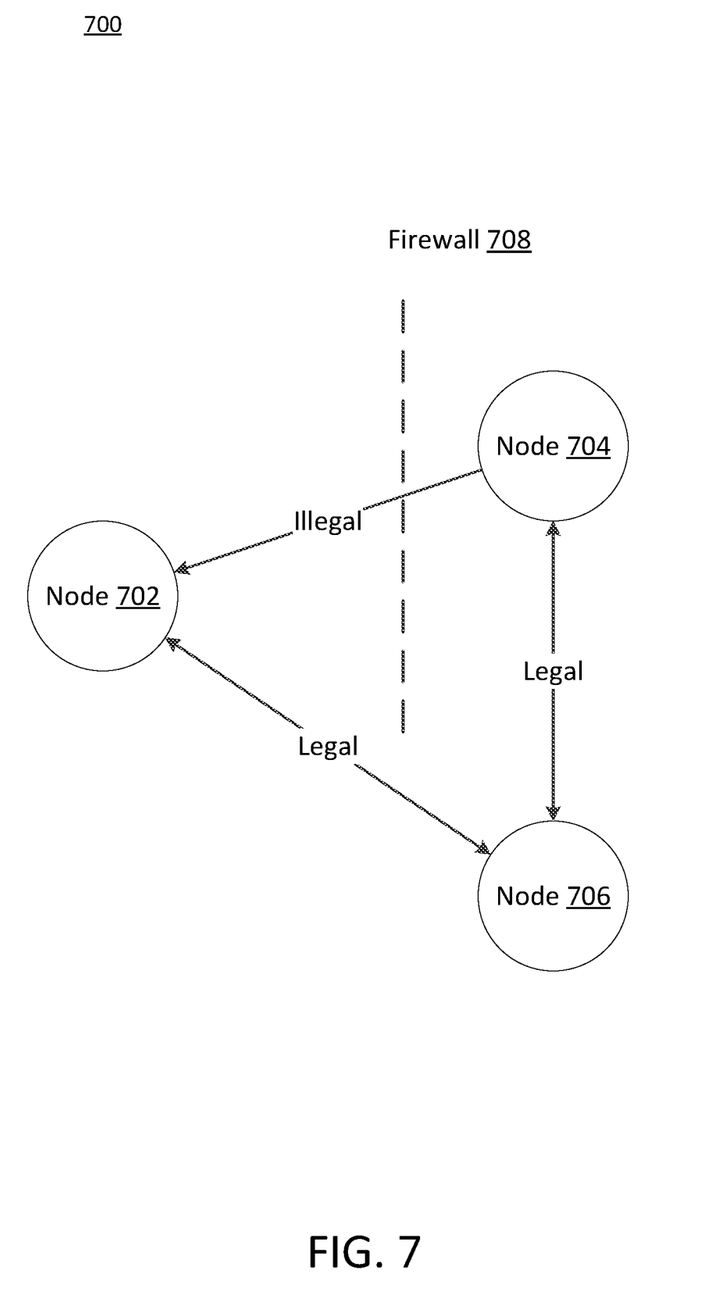
FIG. 7 is a diagram illustrating the negative checking of nodes in a network, according to one embodiment.

FIG. 7 is a diagram illustrating the negative checking of nodes in a network, according to one embodiment. The environment 700 includes three nodes 702, 704, and 706. A firewall 708 separates the node 704 from the node 702 and is configured to prevent these nodes from accessing each other. An attempt by the node 702 to access the node 704, thereby breaching the firewall, is illegal as specified by the node policy of the network. The node 706 may request node 702 to attempt to access node 704. If node 704 grants access to node 702, then at least one of these nodes, or the firewall 708 separating them, may be configured incorrectly. In response to a notification from node 702 that a potentially illegal access occurred, node 706 takes diagnostic or corrective action to ensure that nodes 702 and 704 cannot interact further.

As described earlier, in some embodiments a network may not include a firewall 708. Instead, individual nodes may be configured to grant or deny requests for access from neighboring nodes. In these instances, corrective action may include reconfiguration of one or both nodes, or a modification of policy copies in one or more affected nodes (for instance, for instance by updating the policy to a more recent version of the policy, by altering the policy to account for an error identified within the policy responsible for the policy violation, and the like).

Figure 8:
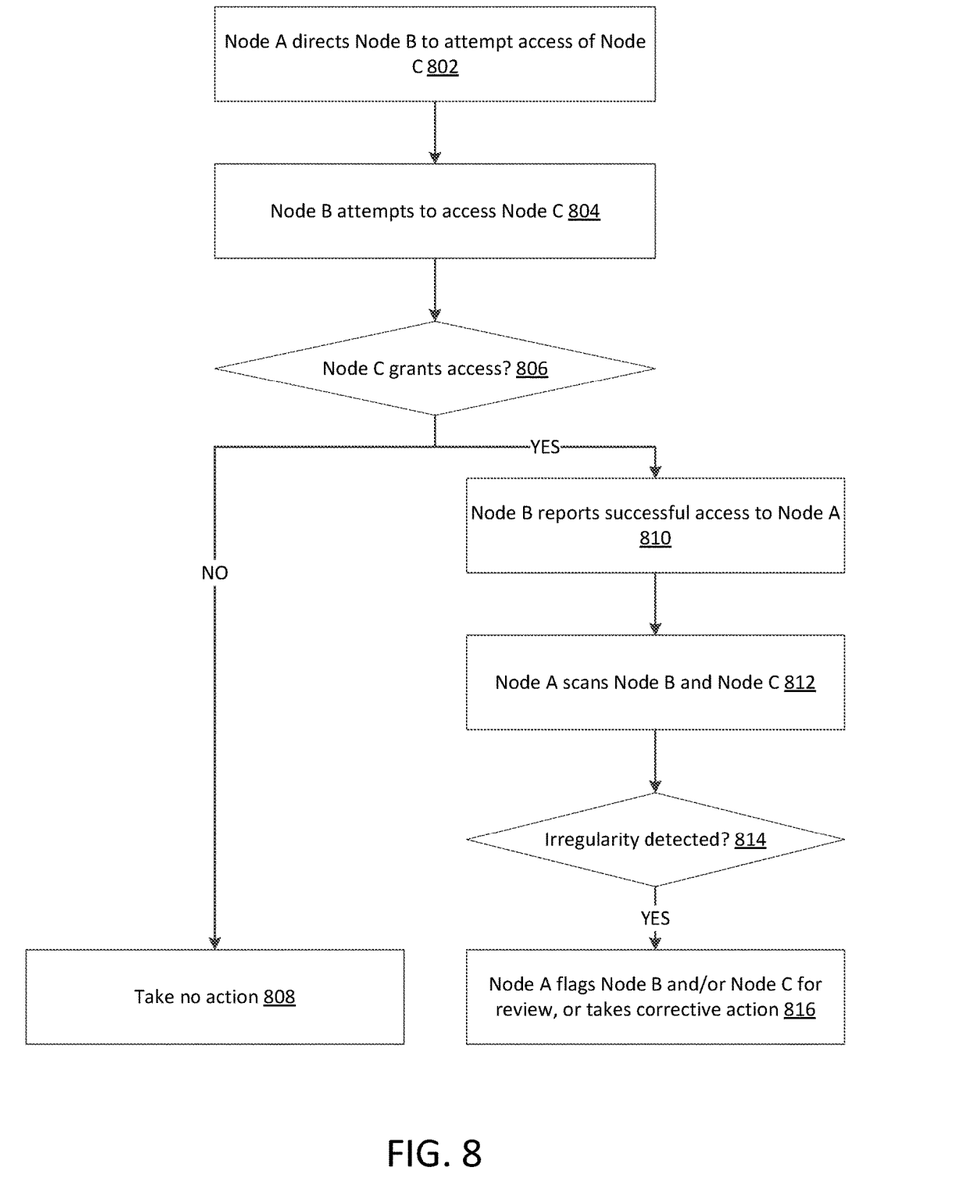
FIG. 8 is a flowchart illustrating one example of negative compliance checking in a network, according to one embodiment.

FIG. 8 is a flowchart illustrating one example of negative compliance checking in a network, according to one embodiment. In a multi-node network consisting of at least three nodes A, B, and C, the node B and the node C are restricted from interacting with one another by a firewall. The node A directs 802 the node B to attempt to access the node C. The node B attempts 804 to access the node C. If the node B determines 806 that the access attempt is unsuccessful, the node B does not take 808 further action. If the node B determines 806 that the access attempt is successful, the node B reports 810 to the node A that the attempt was successful, thereby indicating a possible configuration error. In response, the node A scans 812 the node B and the node C. The node A determines 814 if one or more irregularities or policy compliance violations are detected, and if so, the node A flags 816 the node B, the node C, and/or the firewall for review, or takes a corrective action with regards to the nodes B or C and/or the firewall.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for network management and policy compliance comprising:
    scanning, by a first node of a network, a target node communicatively coupled to the first node within the network to determine a configuration of the target node;
    determining, based on the scan, that the configuration of the target node is in violation of a security policy;
    requesting, by the first node, one or more common neighbor nodes of the first node and the target node to scan the target node;
    scanning, by the one or more common neighbor nodes of the first node and target node, the target node to determine the configuration of the target node;
    determining, by the one or more common neighbor nodes, whether the configuration of the target node is in violation of the security policy;
    responsive to a determination by the one or more common neighbor nodes that the target node is in violation of the security policy, modifying one or both of a local copy of the security policy stored by the target node to match a local copy of the security policy stored by the first node and the configuration of the target node so that the target node is not in violation of the security policy; and
    responsive to a determination by the one or more common neighbor nodes that the target node is not in violation of the security policy, scanning by a set of neighbor nodes each directly communicatively coupled to the first node, the first node to determine if the first node is in violation of the security policy, wherein the set of neighbor nodes includes at least one neighbor node that is not included within the one or more common neighbor nodes, and, responsive to a determination that the first node is in violation of the security policy, modifying one or more of a local copy of the security policy stored by the first node and the configuration of the first node so that the first node is not in violation of the security policy.

2. The computer-implemented method of claim 1, wherein each node in the network stores a local copy of the security policy.

3. The computer-implemented method of claim 1, wherein the first node is scanned by one or more of the set of neighbor nodes communicatively coupled to the first node in response to a determination by a majority of the common neighbor nodes that the target node is not in violation of the security policy.

4. The computer-implemented method of claim 1, wherein the modification of the configuration of the target node is performed only in response to a determination by a majority of the first node and the common neighbor nodes that the target node is in violation of the security policy.

5. The computer-implemented method of claim 1, wherein determining that the target node is in violation of the security policy comprises requesting and receiving access to a prohibited resource of the target node.

6. The computer-implemented method of claim 1, wherein determining that the target node is in violation of the security policy comprises attempting to perform a prohibited interaction with the target node and receiving a prohibited response from the target node.

7. A management system for network management and policy compliance, the management system including at least one hardware processor configured to execute instructions stored on a non-transitory computer-readable storage medium to perform steps comprising:
   scanning a target node communicatively coupled to the management system to determine a configuration of the target node;
   determining, based on the scan, that the configuration of the target node is in violation of a security policy;
   requesting one or more common neighbor nodes of the management system and the target node to scan the target node, the one or more common neighbor nodes configured to scan the target node to determine the configuration of the target node and to determine if the configuration of the target node is in violation of the security policy;
   responsive to a determination by the one or more common neighbor nodes that the target node is in violation of the security policy, modifying one or both of a local copy of the security policy stored by the target node to match a local copy of the security policy stored by the first node and the configuration of the target node so that the target node is not in violation of the security policy; and
   responsive to a determination by the one or more common neighbor nodes that the target node is not in violation of the security policy, requesting by a set of neighbor nodes each directly communicatively coupled to the management system, a scan of the management system to determine if the management system is in violation of the security policy, wherein the set of neighbor nodes includes at least one neighbor node that is not included within the one or more common neighbor nodes, and, responsive to a determination that the management system is in violation of the security policy, modifying one or more of a local copy of the security policy stored by the management system and the configuration of the management system so that the first node is not in violation of the security policy.

8. The management system of claim 7, further configured to store a local copy of the security policy.

9. The management system of claim 7, wherein the set of one or more common neighbor nodes are further configured to scan the management system in response to a determination by a majority of the common neighbor nodes that the target node is not in violation of the security policy.

10. The management system of claim 7, wherein the modification of the configuration of the target node is performed only in response to a determination by a majority of the first node and the common neighbor nodes that the target node is in violation of the security policy.

11. The management system of claim 7, further configured to:
   request access to a prohibited resource of the target node; responsive to receiving access to the prohibited resources of the target node, determine that the target node is in violation of the security policy.

12. The management system of claim 7, wherein determining that the target node is in violation of the security policy comprises attempting to perform a prohibited interaction with the target node and receiving a prohibited response from the target node.

13. A computer-implemented method for network management and policy compliance comprising:
   scanning, by a first node of a network, a target node communicatively coupled to the first node within the network to determine a configuration of the target node;
   determining, based on the scan, that the configuration of the target node is in violation of a security policy;
   requesting, by the first node, one or more common neighbor nodes of the first node and the target node to scan the target node;
   scanning, by the one or more common neighbor nodes of the first node and target node, the target node to determine the configuration of the target node;
   determining, by the one or more common neighbor nodes, whether the configuration of the target node is in violation of the security policy;
   responsive to a determination by the one or more common neighbor nodes that the target node is in violation of the security policy, isolating, by one or more of the first node and the one or more common neighbor nodes, the target node from the network by preventing the target node from interacting with the one or more of the first node and any common neighbor nodes; and
   responsive to a determination by the one or more common neighbor nodes that the target node is not in violation of the security policy, scanning by a set of neighbor nodes each directly communicatively coupled to the first node, the first node to determine if the first node is in violation of the security policy, wherein the set of neighbor nodes includes at least one neighbor node that is not included within the one or more common neighbor nodes, and, responsive to a determination that the first node is in violation of the security policy, isolating, by one or more of the set of neighbor nodes, the first node from the network by preventing the first node from interacting with the one or more of the set of neighbor nodes.

14. The computer-implemented method of claim 13, wherein isolating the target node comprises establishing a firewall between the target node and the one or more of the first node and any common neighbor nodes.

15. The computer-implemented method of claim 13, wherein isolating the target node comprises blacklisting, by the first node and any common neighbor nodes, the IP address of the target node.

16. The computer-implemented method of claim 13, wherein each node in the network stores a local copy of the security policy.

17. The computer-implemented method of claim 13, wherein the first node is scanned by one or more of the set of neighbor nodes communicatively coupled to the first node in response to a determination by a majority of the common neighbor nodes that the target node is not in violation of the security policy.

18. The computer-implemented method of claim 13, wherein the modification of the configuration of the target node is performed only in response to a determination by a majority of the first node and the common neighbor nodes that the target node is in violation of the security policy.

19. The computer-implemented method of claim 13, wherein determining that the target node is in violation of the security policy comprises requesting and receiving access to a prohibited resource of the target node.

20. The computer-implemented method of claim 13, wherein determining that the target node is in violation of the security policy comprises attempting to perform a prohibited interaction with the target node and receiving a prohibited response from the target node.

* * * * *